April 6, 1937. W. J. BAUROTH 2,076,261
ELECTRICAL CONNECTER
Filed May 11, 1933    2 Sheets-Sheet 1

INVENTOR:
Walter J. Bauroth,
BY
Chas. M. Nissen,
ATT'Y.

April 6, 1937.　　　W. J. BAUROTH　　　2,076,261
ELECTRICAL CONNECTER
Filed May 11, 1933　　　2 Sheets-Sheet 2
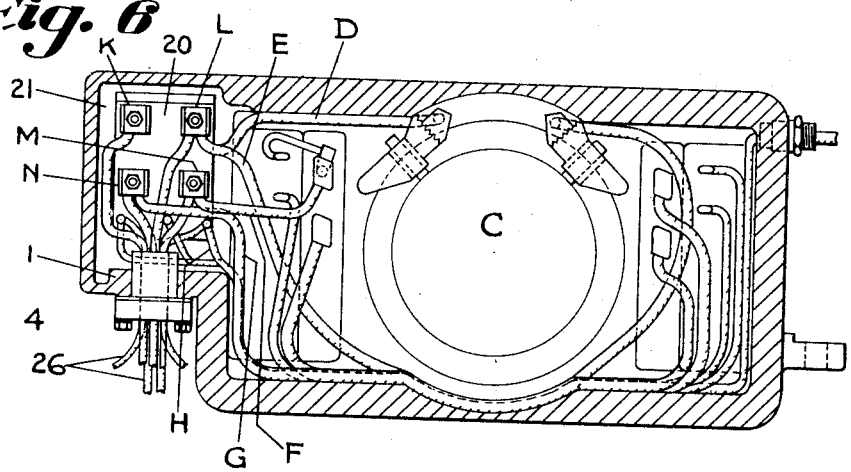
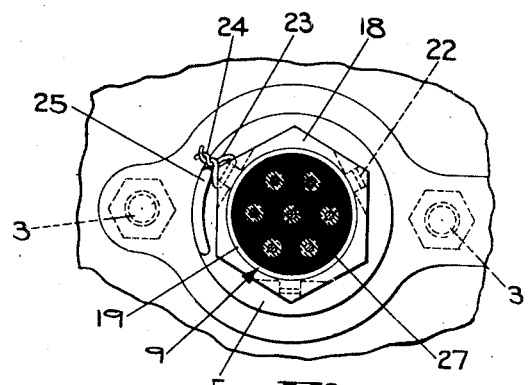
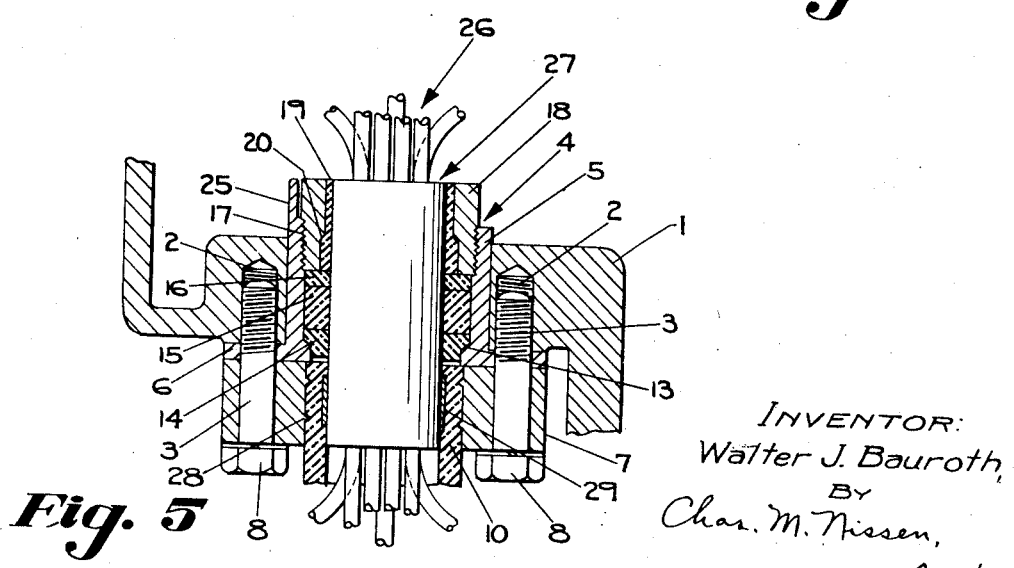
INVENTOR:
Walter J. Bauroth,
BY
Chas. M. Nissen,
ATT'Y.

Patented Apr. 6, 1937

2,076,261

UNITED STATES PATENT OFFICE 2,076,261

ELECTRICAL CONNECTER

Walter J. Bauroth, Columbus, Ohio, assignor to The Jeffrey Manufacturing Company, a corporation of Ohio Application May 11, 1933, Serial No. 670,529

4 Claims. (Cl. 247—1)

In the construction of electric motors especially those adapted to be used in locations where a combustible or explosive atmosphere may be encountered, such for example in carrying out underground mining operations, it is essential that the motor casing be properly sealed to prevent sparks from the motor reaching the atmosphere. This has meant that each time the motor is removed for repairs and replaced, the leads from the power supply line must be replaced and individually sealed into the motor casing in such a manner that there will be no risk of sparks from the motor contacting with the surrounding atmosphere. Such seals, of course, must be broken to remove the power supply cable and leads when the motor is removed for repairs, and, consequently, both the removal and replacement of the motor are attended with a substantial amount of inconvenience.

The present invention provides a means for enabling a comparatively quick and easy removal from, and replacement in, a motor of the power supply cable and leads. More particularly, the present invention provides a unit which carries the power supply cable, the unit serving as a cable stuffing box which is readily insertable into, and removable from, the motor housing, and which will effectively seal the housing against all possible escape of sparks therefrom.

The invention is exemplified in the combination and arrangement of parts shown in the accompanying drawings and described in the following specification, and it is more particularly pointed out in the appended claims.

In the drawings:

Fig. 4 is an end view of the stuffing box unit of this invention showing the inner end of the stuffing box, the view showing one form of locking means which may be employed to secure the parts in proper assembled relation;

Fig. 5 is a view similar to Fig. 3, but showing a different form of conductor cable; and Fig. 6 is a view similar to Fig. 2 showing the application of the cable of Fig. 5.

Figure 1:
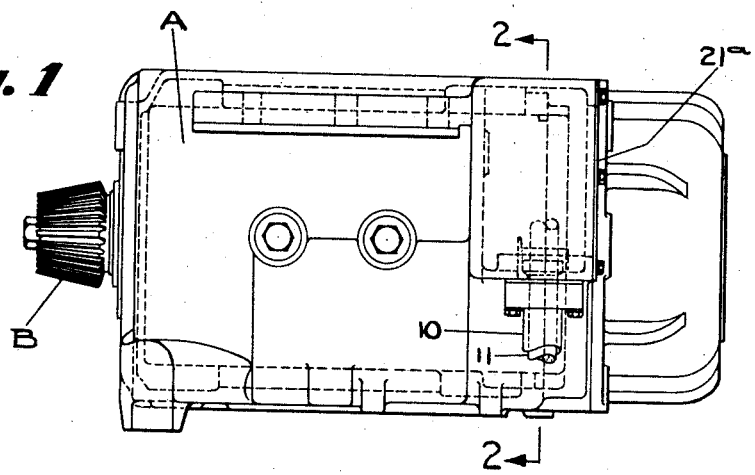
Fig. 1 is an elevation of a motor provided with the improved features of the present invention.
Figure 2:
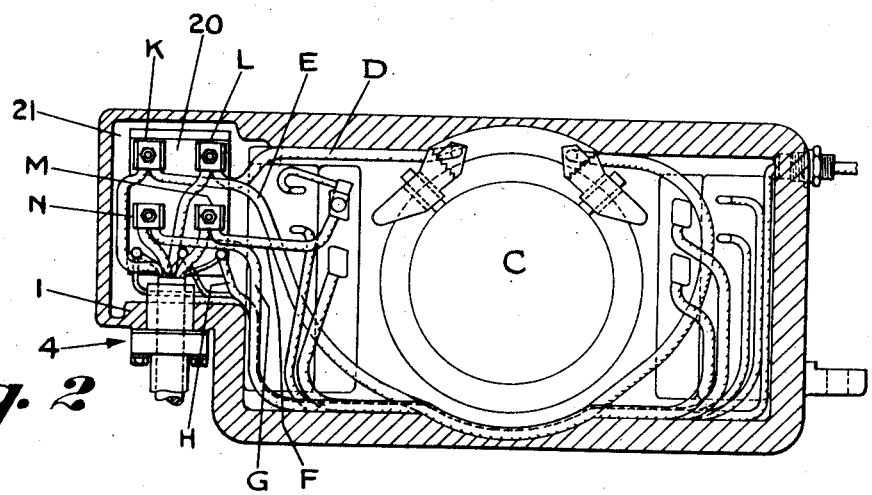
Fig. 2 is a transverse section on the line 2—2 of Fig. 1, looking in the direction of the arrows.
Figure 3:
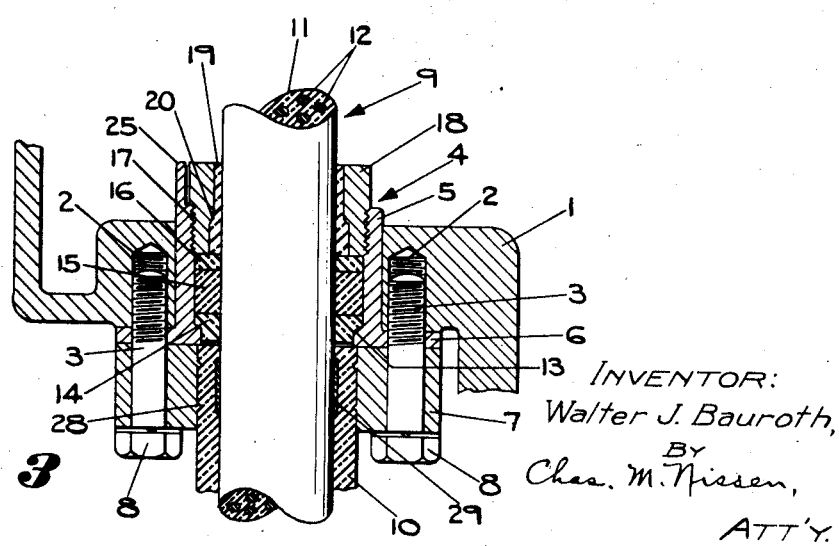
Fig. 3 is an enlarged detail sectional view through the stuffing box showing the details of the interior construction thereof, the power supply cable being shown in elevation for reasons of clarity.

Referring more particularly to the drawings, the motor housing is indicated generally at A, from which housing extends the drive pinion B. The housing of course contains the usual rotor and associated parts of the motor indicated diagrammatically at C in Fig. 2. Suitable leads, indicated generally at D, E, F, G and H, respectively, are attached to the binding posts K, L, M and N in the usual manner.

The motor housing A is provided with an offset portion 1, provided with internally threaded openings 2 for receiving a plurality of bolts 3. These bolts are employed for removably securing the stuffing box unit 4 of the present invention in position in the housing, which is suitably apertured for the reception thereof in a manner which will be obvious.

The unit itself comprises a bushing 5 having, on one end, a flanged collar 6 provided with holes adapted to register with the apertures 2, through which holes are passed the bolts 3. A washer 7 is also provided, this washer having holes therethrough for the passage of the bolts 3, the washer 7 clamping against the flange 6 of bushing 5 by the action of the heads 8 of the bolts, as the bolts are tightened. The bushing 5 is thus secured in place.

The power supply cable 9 is passed through the washer and bushing being held in place in the manner hereinafter described. The cable 9 is provided with the insulating sheath 10, which is terminated at the flange 6 of bushing 5, it being understood that the cable 9 is itself insulating material, as indicated at 11, in which is embedded the conductor strands 12.

It will be observed that the bushing 5 is provided with an interior annular abutment 13, against which is received a ring 14, the internal diameter of which is such as to fit snugly around the cable 9. This ring also fits closely the inside of the bushing 5.

Against the ring 14 is inserted an insulating packing seal 15, which closely fits around the cable 9 and the interior of the bushing 5. A washer 16 snugly engages the seal 15.

It will be noted that the bushing 5 is internally threaded, as indicated at 17. These threads 17 receive a gland 18, which, when tightened on the threads 17, clamps against the washer 16, thus holding the washer 16, packing seal 15, and ring 14, tightly in position. In order to provide a bearing surface for the gland 18, there is provided a fiber sleeve 19 intermediate the gland 18 and cable 9, upon which sleeve the gland 18 turns. The sleeve 19 has a shoulder 20 against which the gland 18 abuts, so that when the gland 18 is tightened on the threads 17, the sleeve 19 is tightened with it against the washer 16. This action compresses the packing 15 into very tight frictional engagement with the cable 9 and bushing 5, and seals the construction absolutely gas tight. The packing 15 is desirably of compressible fibrous material which is unaffected by heat; in practice, asbestos is found to be suitable for this purpose. The ring 14, washer 16 and sleeve 19 are also of insulating fibrous material, so there is no possibility of grounding the conductors 12 to the casing 1.

The binding posts K, L, M, N are mounted on a board 20, in the permissible compartment 21, which is integral with the housing A. The compartment 21 is provided with a removable cover 21a for access to the interior of the compartment.

In order to maintain the parts in proper assembled relation, an interior locking device is employed. This is well illustrated in Fig. 4, which shows the gland 18 as being hexagonal in shape, although not necessarily of such form, selected corners of which are bored through as indicated at 22. Through these holes 22 is inserted at least one wire 23, the ends of which are twisted together as shown at 24 and engage abutment 25 on the bushing 5. By this means the gland 18 is prevented from working loose and the parts are maintained in proper assembled relation, as rotation of the clamping nut 18 is thereby prevented.

Since the parts 14, 15, 16 and 19 are of insulating material of a fibrous character, there is no likelihood of the cable 9 becoming abraded in use and the conductor strands 12 thus becoming grounded to the casing. This is an important factor since there is no possibility of an explosion resulting by sparking between the conductors and casing.

It will be seen also that the cable is permanently mounted in the bushing, since the various parts need not be disturbed until it is desired to replace the cable. This replacement is effected by disassembling the various elements by first breaking the lock 23 and removing the gland 18, which gland holds the remaining parts of the assembly in position. The bushing and cable may be removed from and inserted into the motor casing A as a unit, by correspondingly manipulating the bolts 3 in an obvious manner, and it will be apparent that the inconvenience and loss of time incident to packing individual conductors are eliminated by the present invention.

Instead of the multiple conductor cable 9, there may be employed a plurality of individual conductors, as indicated in Figs. 5 and 6. In such instance, the conductors 26 are vulcanized together, as indicated at 27 for a distance corresponding to the total length of the stuffing box, there being formed thereby a multiple conductor cable for that space. The manipulation of the structure is the same as that described above.

It will be noted that on the inner surface of the washer or sleeve 7 there are formed one or more annular ribs 28 adapted to be forced into the material of the insulation 10 by the expansion of a cylindrical thimble 29 which is rolled into the insulation 10 when the parts are assembled, to securely hold the parts together in a permanent union, although the sleeve 7 and insulation 10 may be slipped from the conductor cable, which fits snugly within the insulation 10. The metal sleeve 7 thereby forms a rigid reinforcement for the cable, preventing bending or deformation thereof when the cable enters the motor housing, as well as a rigid attachment member for securing the cable in position in the casing.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. A connecter for electrical apparatus comprising the combination with a casing provided with an opening for receiving the connecter, of a bushing closely fitting the opening, a cable passing through the bushing, a plurality of insulating rings between the cable and bushing in tightly interfitting engagement therewith and providing electrical insulation therebetween, a compressible insulating packing between the rings adapted to be compressed into tight frictional engagement with the cable and bushing to form a gas-tight seal between the cable and bushing for preventing access of atmospheric gases around the cable to the interior of the casing, means within the bushing for effecting compression of the packing, an insulating bearing between the cable and the said means, means including a washer through which said cable extends for securing the bushing to the casing, and an insulating sheath intermediate the cable and washer, the washer forming a rigid reinforcement for the cable, preventing bending or deformation thereof, the insulating members between the cable and washer and bushing effectively preventing grounding of the conductors of the cable with the casing.

2. A connecter for electrical apparatus comprising the combination with a casing provided with an opening for receiving the connecter, of a bushing closely fitting the opening and extending thereinto, a multiple-conductor cable passing through the bushing, removable means for clamping said cable to said bushing and effecting a gas tight fitting therebetween, means including a washer external of said casing through which said cable extends, an insulating sheath between said cable and washer and rigidly attached to the latter, said washer providing an attaching means for the cable, and screw means extending through said washer and into said casing for attaching said sheath thereto.

3. A connecter for electrical apparatus comprising the combination with a casing provided with an opening for receiving the connecter, of a flanged bushing closely fitting the opening and extending thereinto with the flange in contact with said casing, a cable comprising a plurality of conductors bound together and forming a multiple-conductor cable of continuous cross-section, means providing a gas tight connection between said cable and said bushing, a sheathing for said cable, a ring external of said casing and rigidly attached to said sheathing, and means for removably attaching said ring and bushing to said casing, comprising screws extending through said ring and flange and into said casing.

4. A connecter for electrical apparatus comprising the combination with an electric cable formed by a plurality of conductors vulcanized together to provide a cable of circular cross-section which is impervious to gas, of a housing, means constructed and arranged to provide a gas tight connection between said cable and said housing which also provides for removal of the entire cable from said housing, as a unit, said means comprising a bushing having a body portion extending into and closely fitting an aperture in said housing, a flange on said bushing contacting the outer surface of said housing, a gland threaded into said bushing, packing between said cable and bushing, said bushing and gland being constructed and arranged to compress said packing to effect a gas tight seal between said cable and said bushing, an insulating sheath for said cable, a heavy ring rigidly attached to the outside of said sheath at one end thereof, and removable screws extending through said heavy ring and the flange of said bushing and into the housing, whereby the bushing, cable and sheath will be removably attached to the housing to form a gas tight fitting therewith and may be removed from said housing, as a unit.

WALTER J. BAUROTH.